United States Patent
Van Lerberghe

[19]

[11] Patent Number: 5,977,657
[45] Date of Patent: Nov. 2, 1999

[54] ELECTRIC POWER SUPPLY DEVICE FOR PRODUCING A PLURALITY OF VOLTAGES AND APPARATUS COMPRISING SUCH A DEVICE

[75] Inventor: Steven J. W. Van Lerberghe, Le Mans, France

[73] Assignee: U.S. Philips Corporation, New York, N.Y.

[21] Appl. No.: 09/029,400

[22] PCT Filed: Jun. 9, 1997

[86] PCT No.: PCT/IB97/00662

§ 371 Date: Feb. 19, 1998

§ 102(e) Date: Feb. 19, 1998

[87] PCT Pub. No.: WO97/49160

PCT Pub. Date: Dec. 24, 1997

[30] Foreign Application Priority Data

Jun. 19, 1996 [FR] France .................................. 96 07632

[51] Int. Cl.[6] .................................................. H02J 7/00
[52] U.S. Cl. .............................. 307/44; 307/66; 307/85; 320/117; 320/162
[58] Field of Search ................... 307/64, 66, 43, 307/44, 80, 85, 86, 87, 38, 39, 18, 23; 320/117, 103, 126, 162, 163

[56] References Cited

U.S. PATENT DOCUMENTS

| | | | |
|---|---|---|---|
| 4,315,162 | 2/1982 | Ferguson | 307/66 |
| 5,225,761 | 7/1993 | Albright | 320/15 |
| 5,418,402 | 5/1995 | Fujiwara | 307/10.1 |
| 5,497,066 | 3/1996 | Brouillard et al. | 320/117 |
| 5,568,038 | 10/1996 | Tatsumi | 320/14 |
| 5,684,384 | 11/1997 | Barkat et al. | 307/66 |
| 5,686,813 | 11/1997 | Huen et al. | 307/150 |
| 5,703,415 | 12/1997 | Tanaka | 307/66 |
| 5,717,308 | 2/1998 | Nishitani et al. | 396/279 |

FOREIGN PATENT DOCUMENTS

0624944A3  11/1994  European Pat. Off. .

*Primary Examiner*—Albert W. Paladini
*Attorney, Agent, or Firm*—Dicran Halajian

[57] ABSTRACT

A power supply device produces, on a plurality of accesses, a plurality of voltages coming from a plurality of accumulator assemblies formed by at least one accumulator element and connected in series by at least one series connection. The power supply device includes a back-up provision for mitigating discharges of at least one of the accumulator assemblies.

22 Claims, 1 Drawing Sheet

ELECTRIC POWER SUPPLY DEVICE FOR PRODUCING A PLURALITY OF VOLTAGES AND APPARATUS COMPRISING SUCH A DEVICE

BACKGROUND OF THE INVENTION

The invention relates to a power supply device for producing on a plurality of accesses a plurality of voltages coming from a plurality of accumulator assemblies formed by at least one accumulator element and connected in series by at least one series connection.

The invention also relates to an apparatus comprising such a device.

Such a device finds highly significant applications notably in the field of cordless telephone sets. Actually, these sets comprise, on the one hand, high-frequency circuits which call for relatively high voltages, and, on the other hand, logic circuits which call for less high voltages.

A device of this type is described in European Patent No. 0 624 944. This known device makes use of DC voltage converters which are considered costly, cumbersome and heavy. They are thus not suitable for the application discussed above where, for reasons that the apparatus must be portable, a small weight and as small dimensions as possible are needed while a reasonable cost price is maintained.

The invention proposes a device of the type mentioned in the opening paragraph which largely remedies the drawbacks of price, size and weight presented by the known device.

SUMMARY OF THE INVENTION

Therefore, a device of the type defined in the opening paragraph is characterized in that it comprises auxiliary means for mitigating discharges by at least one of the accumulator assemblies.

BRIEF DESCRIPTION OF THE DRAWING

These and other aspects of the invention will be apparent from and elucidated with reference to the embodiments described hereinafter.

In the drawings.

DESCRIPTION OF PREFERRED EMBODIMENTS

Figure 1:
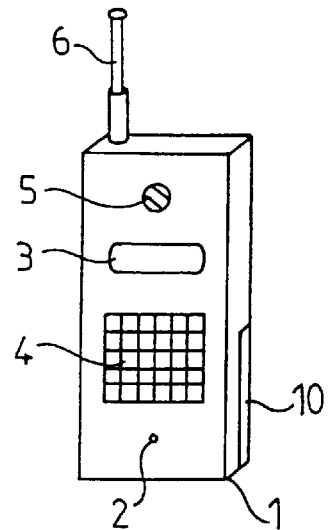
FIG. 1 shows an apparatus according to the invention.

The apparatus shown in FIG. 1 is a Global System for Mobile Communications (GSM) terminal, for example. It comprises a casing 1 on which are provided a microphone 2, a screen 3, a keypad 4, an earpiece 5 and an antenna 6. For supplying power to this device, it includes a power supply device 10 according to the invention, whose diagram is shown in FIG. 2.

Figure 2:
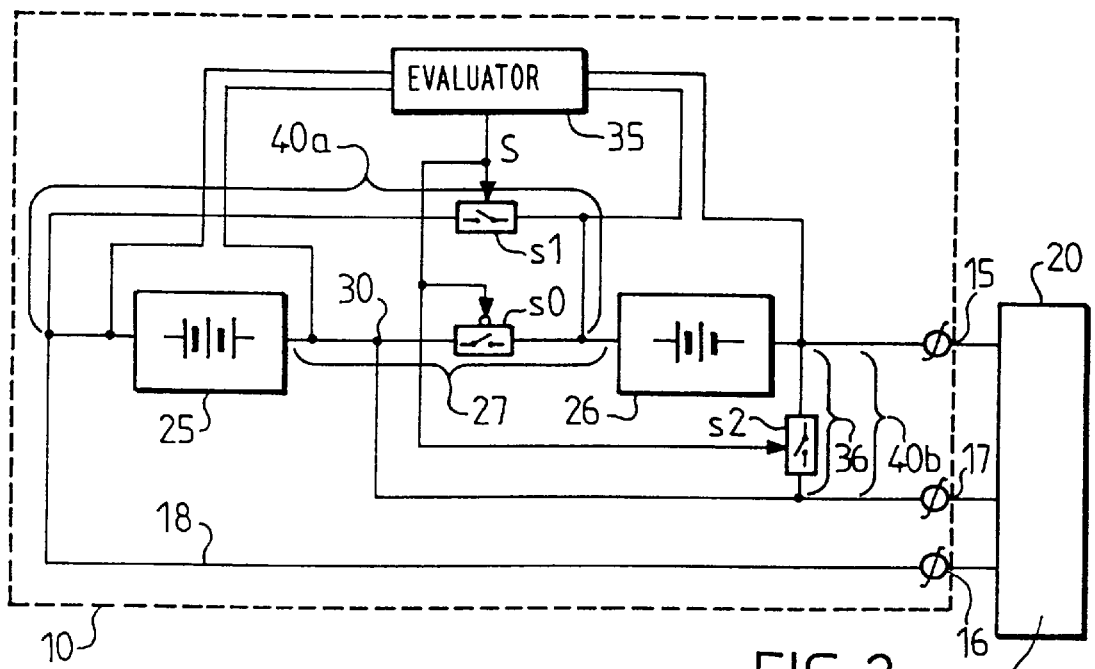
FIG. 2 shows a device according to the invention.

The device shown in FIG. 2 is intended to provide two different voltages on accesses 15 and 16 and also on accesses 17 and 16. These voltages, seen from a common voltage line 18 connected to the access 16, are necessary for supplying power to the electronic part 20 of the apparatus. This electronic part comprises logic circuits for managing the apparatus, fed via the accesses 17–16, and a radio circuit formed by a receiver circuit and a transmitter circuit which need to have a relatively high supply voltage. The radio circuit is fed by the voltage present on accesses 15–16.

For obtaining these voltages, two accumulator assemblies 25 and 26 connected by a series connection 27 are used. This series connection comprises a branch point 30. The first voltage is formed by the voltage of the first assembly 25 occurring at accesses 17 and 16. The branch point 30 is then connected to access 17. The second voltage is formed by the fact that the two assemblies, whose ends again occur at accesses 15 and 16, are combined in series.

The charging state of the assemblies 25 and 26 is evaluated by an evaluation circuit 35 which produces an active signal S when an accumulator assembly seems to be discharged. For assisting, nevertheless, the apparatus to which it is connected within the scope of this described example, the assembly 25 has a large capacity and the assembly 26 a small capacity, it is therefore supposed that only assembly 26 is discharged.

When the signal S is active, a switch assembly formed by switch circuits s0, s1 and s2 creates a back-up line 36 for sending the voltage of the assembly 25 to access 15–16. Although this voltage is less than the voltage provided, the receiver circuit of the electronic part 20 can still operate, but the transmitter circuit will no longer operate. This back-up line 36 is thus formed by the switch circuit s2 in a closed state.

According to a significant characteristic of the invention, when the signal S is active, a charging link is created, formed by a part 40a and a part 40b. In this described example the part 40b is identical with the switch circuit s2 and the part 40a with a switch circuit s1 which connects one end of the assembly 26 to the shared voltage line 18. The accumulator assemblies are thus connected in parallel.

It should be noted that this charging could systematically take place for an application according to which a high voltage is only required intermittently. This is notably the case in subscriber sets of the GSM system which change from a state of rest for which the management and the listening mode are solely induced to an active state for which transmission must be ensured. The active state can only take place every eighth time period. The charging of the assembly 26 may take place during the states of rest of the apparatus. Thus, in normal operation, the switch circuits s1 and s2 are open, whereas the switch s0 is closed. When the signal S is active, the switch circuits s1 and s2 are closed, whereas the switch s0 is open.

Figure 3:
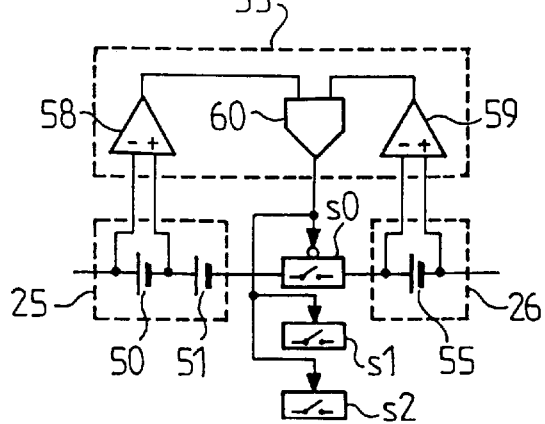
FIG. 3 shows a preferred embodiment of an evaluation circuit which forms part of a device according to the invention.

FIG. 3 shows a preferred embodiment of the evaluation circuit 35. In this embodiment, the accumulator assemblies 25 and 26 are of the same type. The assembly 25 is formed by at least two accumulator elements 50 and 51 which have a large capacity, and the assembly 26 by a single accumulator element 55. Two amplifiers 58 and 59 produce on their output a signal that represents the voltage delivered by the accumulator elements 50 and 55, respectively. A comparator 60 for comparing these output signals produces the signal S which, when it is active (the voltage of element 55 is lower than that of element 50), opens the switch s0 and closes the switches s1 and s2.

The switch circuits s0, s1 and s2 discussed above may be formed by MOS-type transistors, as this is well known in this field of technology.

The accumulator assemblies are preferably formed on the basis of those described in U.S. Pat. No. 5,047,300.

Although the description has been made with two accumulator assemblies, the invention also covers the fact that a plurality of accumulator assemblies can be used and a high capacity condensor can constitute any one of the accumulator elements.

What is claimed is:

1. A power supply device having a rest mode and a charge mode comprising:
 a first battery for providing a first voltage to a first pair of terminals;
 a second battery;
 a switching assembly which selectively provides a series connection between said first battery and said second battery in said rest mode to supply a second voltage to a second pair of terminals; and
 a control circuit which monitors a first voltage level of said first battery, said control circuit changing said rest mode to said charge mode when said first voltage level drops below a predetermined level by selectively switching said switching assembly to disconnect said series connection and provide a parallel connection between said first battery and said second battery; second battery charging said first battery during said charge mode.

2. The power supply device of claim 1, wherein said second battery has a higher capacity than said first battery.

3. The power supply device of claim 1, wherein said first voltage equals a second voltage level of said second battery.

4. The power supply device of claim 1, wherein said second battery includes at least two elements, one of said elements providing a second voltage level which equals said first voltage.

5. The power supply device of claim 1, wherein said control circuit further monitors a second voltage level of said second battery.

6. The power supply device of claim 1 for an apparatus operating intermittently between said rest mode and said charge mode.

7. The power supply device of claim 1, wherein said power supply device does not include a voltage converter.

8. A power supply device having a rest mode and a charge mode comprising:
 a first battery for providing a first voltage to a first pair of terminals;
 a second battery;
 a switching assembly which selectively provides a series connection between said first battery and said second battery in said rest mode to supply a second voltage to a second pair of terminals; and
 a control circuit which monitors a first voltage level of said first battery, said control circuit changing said rest mode to said charge mode when said first voltage level drops below a predetermined level by selectively switching said switching assembly to disconnect said series connection and provide a parallel connection between said first battery and said second battery; said control circuit including a comparator for comparing said first voltage level with a second voltage level of said second battery.

9. The power supply device of claim 8, wherein said control circuit further includes an amplifier connected between said comparator and one of said first battery and said second battery.

10. The power supply device of claim 8, wherein said control circuit further includes a first amplifier connected between said comparator and said first battery, and a second amplifier connected between said comparator and said second battery.

11. A power supply device having a rest mode and a charge mode comprising:
 a first battery for providing a first voltage to a first pair of terminals;
 a second battery; and
 a switching assembly which selectively provides a series connection between said first battery and said second battery in said rest mode to supply a second voltage to a second pair of terminals; said switching assembly further selectively providing a parallel connection between said first battery and said second battery in said charge mode to charge said first battery with said second battery.

12. The power supply device of claim 11, wherein said second battery has a higher capacity than said first battery.

13. The power supply device of claim 11, wherein said first voltage equals a second voltage level of said second battery.

14. The power supply device of claim 11, wherein said second battery includes at least two elements, one of said elements providing a second voltage level which equals said first voltage.

15. The power supply device of claim 11 for an apparatus operating intermittently between said rest mode and said charge mode.

16. The power supply device of claim 11, wherein said power supply device does not include a voltage converter.

17. The power supply device of claim 11, further comprising a control circuit which monitors a first voltage level of said first battery, said control circuit changing said rest mode to said charge mode when said first voltage level drops below a predetermined level by providing a control signal to said switching assembly to disconnect said series connection and provide said parallel connection.

18. The power supply device of claim 17, wherein said control circuit further monitors a second voltage level of said second battery.

19. The power supply device of claim 17, wherein said control circuit includes a comparator for comparing said first voltage level with said second voltage level.

20. The power supply device of claim 17, wherein said control circuit further includes a first amplifier connected between said first battery and said comparator, and a second amplifier connected between said second battery and said comparator.

21. A power supply device having a rest mode and a charge mode comprising:
 a first battery;
 a second battery; and
 a switching assembly which selectively provides a series connection between said first battery and said second battery in said rest mode and a parallel connection between said first battery and said second battery in said charge mode to charge said first battery with said second battery.

22. The power supply device of claim 21 for an apparatus operating intermittently between said rest mode and said charge mode.

* * * * *